United States Patent Office 3,043,887
Patented July 10, 1962

3,043,887
PROCESS OF MAKING CHLOROBENZENES
Friedrich Becke, Scheffelstrasse 4, Heidelberg, Germany
No Drawing. Filed Oct. 28, 1959, Ser. No. 849,169
Claims priority, application Germany Oct. 31, 1958
8 Claims. (Cl. 260—650)

This invention relates to a process of making chlorobenzenes. It particularly relates to a process of making dichlorobenzenes, trichlorobenzenes and tetrachlorobenzenes, and especially the technically interesting 1,2,4,5-tetrachlorobenzene, by treating hexachlorohexanes with sulphur.

It is known that a mixture of trichlorobenzenes is obtained when hydrogen chloride is split off from hexachlorocyclohexanes. The dehydrochlorination is effected either by thermal decomposition or by the action of a basic reagent. The reaction is generally used for the dehydrochlorination of the isomeric by-products obtained in the preparation of $\gamma$-hexachlorocyclohexane. However, there are insufficient uses for the trichlorobenzenes which are formed. It would be desirable therefore to have other processes, in which in addition to trichlorobenzenes other compounds of greater technical value are formed.

It has now been found that such a conversion of hexachlorocyclohexanes is obtained when the latter are heated with sulphur.

The advantage of this process is that, in addition to trichlorobenzenes, there are obtained in considerable quantities the valuable dichlorobenzenes and tetrachlorobenzenes and almost exclusively from the latter the technically interesting 1,2,4,5-tetrachlorobenzene.

The process is easy to carry out from a technical viewpoint and hence particularly suited for the treatment of the inert isomeric by-products which are formed in large quantities in the preparation of $\gamma$-hexachlorocyclohexane. The isomeric hexachlorocyclohexanes are mixed with sulphur e.g. in a molar ratio of 1:⅙ to 8, and the mixture is heated, suitably at temperatures from about 200 to 320° C., preferably from 240 to 290° C. The reaction is preferably carried out in a distillation vessel, with agitation of the mixture.

It has been found advantageous to add active carbon, fuller's earth and/or active silicic acid to the reaction mixture.

The process can be carried out under atmospheric pressure or under reduced pressure. It is also advantageous to pass a small flow of nitrogen and/or sulphur dioxide through the reaction mixture.

In the course of 2 to 5 hours a mixture distills over of dichlorobenzenes, trichlorobenzenes and 1,2,4,5-tetrachlorobenzene, which is contaminated by small quantities of sulphur chlorides and also contains small quantities of hexachlorocyclohexane. The sulphur chlorides can be destroyed by stirring with water or a dilute solution of an alkali metal hydroxide, alkaline earth metal carbonate or other basic reagent. There is no need to add the whole of the sulphur right at the beginning of the reaction; it can be added in several portions during the reaction. The reaction mixture obtained can be separated, after the destruction of the sulphur chlorides, by fractional distillation into dichlorobenzenes, trichlorobenzenes and 1,2,4,5-tetrachlorobenzene.

The following examples illustrate the invention. All parts are by weight.

Example 1

1164 parts of $\alpha$-hexachlorocyclohexane are mixed with 128 parts of powdered sulphur and heated in a distillation vessel, provided with agitators and carrying a small fractionating column, to 270–290° C. and kept at this temperature for about 4 hours. During this time 632 parts of chlorobenzenes, containing small quantities of hexachlorocyclohexane, distill over. This mixture is then subjected to fractional distillation at 20 mm. mercury pressure. 74 parts of dichlorobenzenes, 270 parts of trichlorobenzenes and 128 parts of 1,2,4,5-tetrachlorobenzene are obtained, together with 160 parts of unreacted hexachlorocyclohexane.

Example 2

1164 parts of hexachlorocyclohexane are mixed with 576 parts of sulphur and heated in the apparatus described in Example 1 to 260–300° C. 700 parts of a mixture of chlorobenzenes and unreacted starting material are obtained. This mixture is agitated with water at 60 to 100° C. for a short period and, after separating off the water, distilled under reduced pressure. There are obtained by fractionation 77 parts of dichlorobenzenes, 310 parts of trichlorobenzenes and 131 parts of tetrachlorobenzene, together with 150 parts of $\alpha$-hexachlorocyclohexane.

Example 3

1164 parts of a mixture of isomeric hexachlorocyclohexanes, obtained as a by-product in the preparation of $\gamma$-hexachlorocyclohexane, are mixed with 64 parts of sulphur and 60 parts of active carbon and heated in the apparatus described in Example 1 to 230–310° C. In the course of 5 hours 671 parts of distillate are obtained. This distillate is agitated with water at about 50° C. and distilled under reduced pressure after separating off the water.

There is obtained by fractionation 109 parts of dichlorobenzenes, 367 parts of trichlorobenzenes and 129 parts of tetrachlorobenzene.

I claim:

1. A process of making at least one chlorobenzene taken from the group consisting of di-, tri-, and tetrachlorobenzenes, comprising heating hexachlorocyclohexane with elemental sulphur in a molar ratio ranging from about 1:⅙ to 1:8, at about 200° to 320° C.

2. A process as claimed in claim 1, wherein the hexachlorocyclohexane is a mixture of isomers obtained as a by-product in the preparation of $\gamma$-hexachlorocyclohexane.

3. A process of making at least one chlorobenzene taken from the group consisting of di-, tri-, and tetrachlorobenzenes, comprising heating hexachlorocyclohexane with a material taken from the group consisting of a substance consisting essentially of sulphur, and a mixture thereof with an adsorbent solid, at about 200 to 320° C.

4. The process defined in claim 3, the hexachlorocyclohexane and sulphur being in a molar ratio ranging from about 1:⅙ to 1:8.

5. A process comprising heating a mixture of hexachlorocyclohexane and sulphur in a molar ratio ranging from about 1:⅙ to 1:8, at about 200° to 320° C., and then subjecting the reacting mixture to fractional distillation to separate it into di-, tri-, and 1,2,4,5-tetrachlorobenzene.

6. A process comprising heating a mixture of hexachlorocyclohexane and sulphur in a molar ratio ranging from about 1:⅙ to 1:8, at about 200° to 320° C., mixing the reaction mixture with water to destroy sulphur chlorides, and then subjecting the reaction mixture to fractional distillation to separate it into di-, tri-, and 1,2,4, 5-tetrachlorobenzene.

7. A process of making dichlorobenzene trichlorobenzene and tetrachlorobenzene, comprising heating a mixture of hexachlorocyclohexane and sulphur at about 200° to 320° C.

8. A process of making 1,2,4,5-tetrachlorobenzene comprising distilling a mixture of hexachlorocyclohexane and sulphur at about 200° to 320° C., and separating said tetrachlorobenzene from the distillate.

References Cited in the file of this patent

UNITED STATES PATENTS 2,792,434    Becke et al. _____ May 14, 1957

FOREIGN PATENTS 191,397    Australia _____ Aug. 26, 1957